United States Patent
Baert et al.

(10) Patent No.: US 12,312,807 B2
(45) Date of Patent: *May 27, 2025

(54) DECORATIVE PANEL

(71) Applicant: Champion Link International Corporation, The Valley (AL)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,766

(22) Filed: Feb. 5, 2024

(65) Prior Publication Data

US 2024/0175261 A1    May 30, 2024

Related U.S. Application Data

(63) Continuation of application No. 17/454,381, filed on Nov. 10, 2021, now Pat. No. 11,946,251.

(30) Foreign Application Priority Data

Oct. 7, 2021  (NL) .................................. 2029345

(51) Int. Cl.
*E04C 2/24* (2006.01)
*B05D 3/06* (2006.01)
(Continued)

(52) U.S. Cl.
CPC .............. *E04C 2/246* (2013.01); *B05D 3/067* (2013.01); *B32B 3/06* (2013.01); *B32B 9/02* (2013.01);
(Continued)

(58) Field of Classification Search
CPC .. E04C 2/246; B32B 3/06; B32B 9/02; B32B 27/06; B32B 37/24; B32B 2037/243;
(Continued)

(56) References Cited

U.S. PATENT DOCUMENTS 3,546,148 A   12/1970  Diamond et al.
3,661,673 A    5/1972  Merriam
(Continued)

FOREIGN PATENT DOCUMENTS

WO    2006033706 A1    3/2006
WO    2010088769 A1    8/2010
(Continued)

OTHER PUBLICATIONS

First Office Opinion Notice, China, mailed Jul. 10, 2024.
(Continued)

*Primary Examiner* — Brent W Herring
(74) *Attorney, Agent, or Firm* — Heslin Rothenberg Farley & Mesiti P.C.

(57) ABSTRACT

The invention relates to a decorative panel, comprising at least one substrate comprising an upper surface and a bottom surface and two pairs of opposing side edges, wherein the substrate comprises at least one core layer and at least one decorative layer and the panel comprising at least one coating layer, wherein the coating layer is provided upon the upper surface of the substrate, wherein both the upper surface of the substrate and the upper coating surface of the coating layer have a predetermined Shore D hardness.

23 Claims, 1 Drawing Sheet

(51) Int. Cl.
  *B32B 3/06* (2006.01)
  *B32B 9/02* (2006.01)
  *B32B 27/06* (2006.01)
  *B32B 37/24* (2006.01)
  *C08J 7/046* (2020.01)
  *E04F 13/08* (2006.01)
  *E04F 13/16* (2006.01)
  *E04F 13/18* (2006.01)
  *E04F 15/02* (2006.01)
  *E04F 15/10* (2006.01)

(52) U.S. Cl.
  CPC .............. *B32B 27/06* (2013.01); *B32B 37/24* (2013.01); *C08J 7/046* (2020.01); *E04F 13/0866* (2013.01); *E04F 13/0894* (2013.01); *E04F 13/16* (2013.01); *E04F 13/18* (2013.01); *E04F 15/02038* (2013.01); *E04F 15/102* (2013.01); *E04F 15/105* (2013.01); *E04F 15/107* (2013.01); *B32B 2037/243* (2013.01); *B32B 2255/10* (2013.01); *B32B 2255/26* (2013.01); *B32B 2307/412* (2013.01); *B32B 2307/536* (2013.01); *B32B 2307/732* (2013.01); *B32B 2310/0831* (2013.01); *B32B 2419/04* (2013.01); *B32B 2451/00* (2013.01); *E04F 2201/023* (2013.01); *E04F 2201/043* (2013.01)

(58) Field of Classification Search
  CPC ............ B32B 2255/10; B32B 2255/26; B32B 2307/412; B32B 2307/536; B32B 2307/732; B32B 2310/0831; E04F 13/0866; E04F 13/0894; E04F 13/16; E04F 13/18; E04F 15/02038; E04F 15/102; E04F 15/105; E04F 15/107; E04F 2201/023; E04F 2201/043
  See application file for complete search history.

(56) References Cited

U.S. PATENT DOCUMENTS

| | | | |
|---|---|---|---|
| 3,962,009 | A | 6/1976 | Minami et al. |
| 4,307,003 | A | 12/1981 | Niswonger |
| 6,440,538 | B1 | 8/2002 | Ungar |
| 8,925,275 | B2* | 1/2015 | Meersseman ......... E04F 15/102 52/592.1 |
| 9,420,681 | B1 | 8/2016 | Huang |
| 9,528,024 | B2 | 12/2016 | Tian et al. |
| 9,631,361 | B2 | 4/2017 | Clausi et al. |
| 10,590,303 | B2 | 3/2020 | Ho et al. |
| 10,677,275 | B1 | 6/2020 | Caselli et al. |
| 11,946,251 | B2 | 4/2024 | Baert et al. |
| 2006/0032175 | A1 | 2/2006 | Chen et al. |
| 2006/0251902 | A1* | 11/2006 | Botrie ................. C08G 18/718 428/423.1 |
| 2012/0103722 | A1 | 5/2012 | Clausi et al. |
| 2012/0225236 | A1 | 9/2012 | Cox |
| 2013/0104485 | A1* | 5/2013 | Meersseman ........... B27N 7/00 428/53 |
| 2014/0170359 | A1 | 6/2014 | Schwitte et al. |
| 2014/0312646 | A1 | 10/2014 | Copp et al. |
| 2016/0025460 | A1 | 1/2016 | Sayre et al. |
| 2017/0218226 | A1 | 8/2017 | Ho et al. |
| 2018/0010329 | A1 | 1/2018 | Golding, Jr. et al. |
| 2018/0079124 | A1 | 3/2018 | Banerjee |
| 2018/0171644 | A1 | 6/2018 | Zhang |
| 2019/0119439 | A1 | 4/2019 | Queen et al. |
| 2019/0145109 | A1 | 5/2019 | Esbelin |
| 2020/0011060 | A1 | 1/2020 | Haynes et al. |
| 2020/0139656 | A1 | 5/2020 | Olds |
| 2020/0139686 | A1* | 5/2020 | Rao ...................... E04F 15/105 |
| 2021/0187925 | A1 | 6/2021 | Hill et al. |
| 2022/0153927 | A1 | 5/2022 | Queen et al. |
| 2023/0115940 | A1 | 4/2023 | Baert et al. |
| 2023/0125460 | A1* | 4/2023 | Baert ....................... B05D 3/12 428/172 |
| 2024/0175262 | A1 | 5/2024 | Baert et al. |
| 2024/0175263 | A1 | 5/2024 | Baert et al. |

FOREIGN PATENT DOCUMENTS

| | | |
|---|---|---|
| WO | 9917930 A1 | 7/2017 |
| WO | 2017121389 A1 | 7/2017 |
| WO | 2019228621 A1 | 12/2019 |
| WO | 2020007253 A1 | 1/2020 |
| WO | 2020009973 A1 | 1/2020 |
| WO | 2021180882 A1 | 9/2021 |

OTHER PUBLICATIONS

European Patent Office Search Report in NL 2029345 dated Oct. 7, 2021.
European Patent Office Search Report in NL 2029346 dated Oct. 7, 2021.
European Patent Office Search Report in NL 2028108 dated Apr. 30, 2021.
Thomas Luc Martine Baert et al.; Decorative Panel and Method for Producing a Panel; U.S. Appl. No. 17/454,398, filed Nov. 10, 2021.
Thomas Luc Martine Baert et al.; Flooring Panel; U.S. Appl. No. 17/380,581, filed Jul. 20, 2021.
Thomas Luc Martine Baert et al.; Flooring Panel; U.S. Appl. No. 17/804,425, filed May 27, 2022.

* cited by examiner

DECORATIVE PANEL

CROSS REFERENCE TO RELATED APPLICATIONS

This application is a Continuation Application of pending U.S. application Ser. No. 17/454,381, filed Nov. 10, 2021, which claims priority under 35 U.S.C. § 119 to Netherland Patent Application No. NL 2029345 filed on Oct. 7, 2021, which are incorporated herein by reference in their entirety.

FIELD OF THE INVENTION

The invention relates to a decorative panel, such as a floor panel, wall panel or ceiling panel. The invention also relates to a method for producing such decorative panel.

BACKGROUND

The manufacturing of decorative panels typically includes the steps of applying a finishing layer or coating layer to the surface of the boards to apply a desired gloss level that complements the décor, while ensuring the surface's resistance to staining, scratches, abrasion and the like. The finishing layer of wood-based and polymeric flooring panels in particular are generally sprayer-, roller- or curtain-applied ultraviolet-cured coatings (UV coatings). Such UV coatings are greatly preferred in industrial application because of their advantages such as speed of production, instantaneous drying time, good abrasion resistance, high clarity and gloss finish. In the field of heterogeneous resilient flooring, this coating layer is typically applied on top of a so-called transparent thermoplastic wear layer. Said wear layer has a protective function. The use of wear layers is so engrained in the industry that its binder content and its thickness form the basis of the classification requirements for level of use in industry standards. For example, the thickness of the wear layer defines the so-called Class of Use in ISO 10582 "Resilient Floor Coverings—Heterogeneous poly(vinyl chloride) floor covering—Specifications" without necessitating even a laboratory test to verify abrasion resistance, scratch resistance and the like.

These known thermoplastic wear lavers are typically made of plasticized polyvinyl chloride (PVC) and are relatively soft. The plasticizer content of such plasticized PVC can reach up to 10 to 15%, versus around 85-90% PVC. This plasticized wear layer is a remnant of times when plasticized vinyl was also primarily used as core material in the production of resilient floorings, specifically "luxury vinyl tile". In recent, years, non-plasticized PVC, rPVC or rigid PVC has nearly completely replaced this plasticized vinyl as core material of resilient flooring materials. The plasticized wear layer however persists and is currently still present on basically every square meter of resilient flooring on the market. These conventional panels typically comprise an additional UV coating layer on top of the soft wear layer.

Key performance requirements for the top surface of resilient flooring, and therefore the coating layer and wear layer, include abrasion resistance (EN 13329, ASTM D4060), scratch resistance (ISO 1518), microscratch resistance (EN 16094), stain resistance (ISO 26987), slip resistance (ANSI 137.1, EN 13893), among many others. Of these, scratch resistance has always been the most difficult item to improve, and resilient flooring has therefore always had the reputation of not being very scratch resistant, especially when compared to laminate which features an extremely hard, scratch resistant melamine overlay which is known for its good scratch resistance.

It is a goal of the invention to provide a panel having an improved scratch resistance. Alternatively, an object of the present invention is to provide an alternative to the current state of the art.

DETAILED DESCRIPTION

The invention provides thereto a decorative panel, in particular a floor panel, wall panel or ceiling panel, the panel comprising:
- at least one substrate comprising an upper surface and a bottom surface and preferably two pairs of opposing side edges, wherein the substrate comprises:
  - at least one core layer; and
  - at least one decorative layer; and
- at least one coating layer, wherein the coating layer is provided upon the upper surface of the substrate;

wherein the substrate, and in particular the upper surface of the substrate, has a Shore D hardness of at least 80 and wherein the coating layer, and in particular an upper coating surface of the coating layer, has a Shore D hardness of at least 85.

Figure 1:
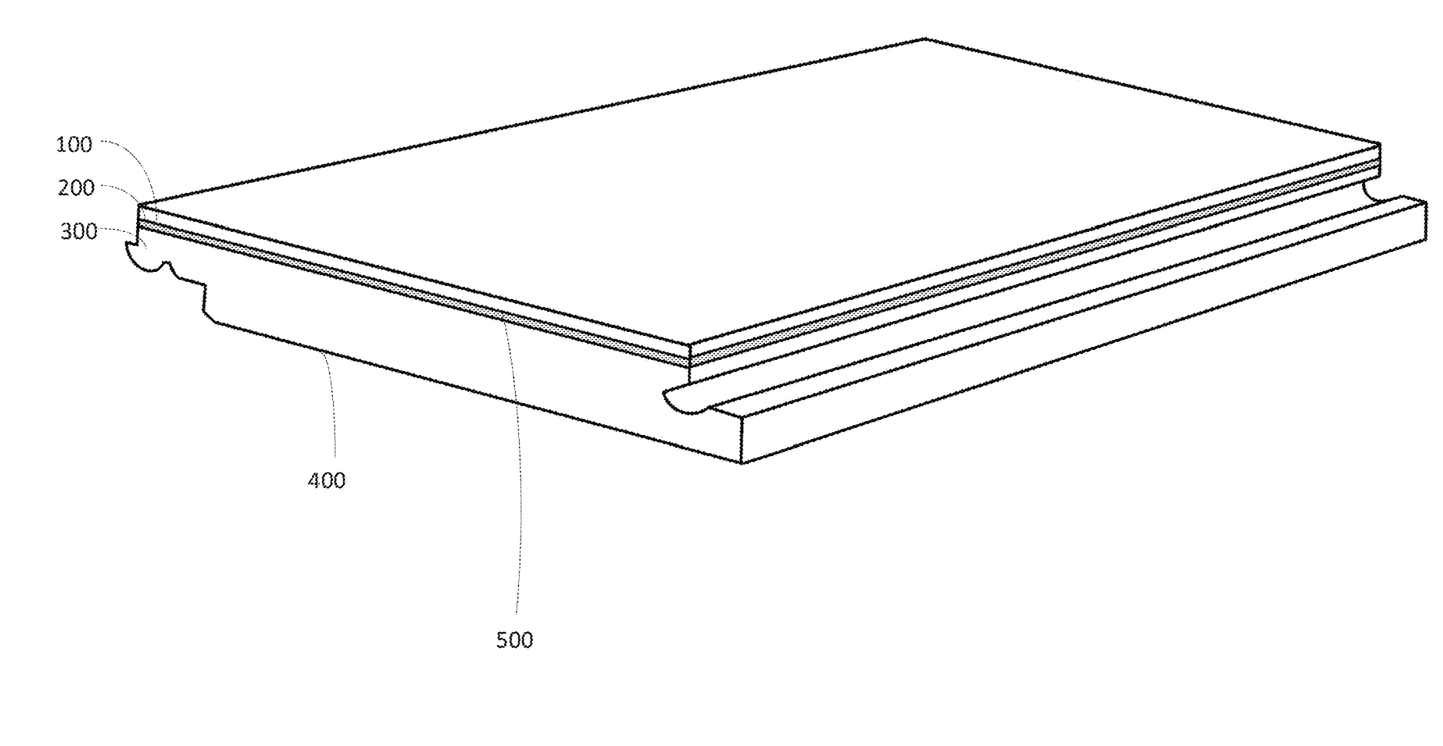
The FIGURE illustrates a non-limiting embodiment of a decorative panel.

The panel according to the present invention benefits of having a good scratch resistance due to the combination of both the substrate and coating layer 100 being relatively hard and the coating layer 100 being provided upon the upper surface 500 of the substrate. The combination of the substrate having a Shore D hardness of at least 80 at 23 degrees Celsius and the coating layer 100 having a Shore D hardness of at least 85, the use of an additional wear layer for protective reasons can be omitted. The scratch resistance of the panel according to the present invention was found to be surprisingly good when using a substrate and coating layer 100 according to the present invention. The coating layer 100 is preferably directly provided upon the upper surface 500 of the substrate. It is non-obvious for someone skilled in the art to omit the use of a wear layer and apply a substrate having a Shore D hardness of at least 80 and a coating layer 100 having a Shore D hardness of at least 85. A conventional route to attempt to increase the scratch resistance of a panel would be to adapt the composition of the coating formulation, for example by addition of abrasive particles such as aluminium dioxide, diamond dust, silicon carbide and the like. This can increase the scratch resistance of the top surface to around 2500 g-3000 g, but further has the undesired effect that it drastically alters the other surface performance characteristics of the coating, especially microscratch and stain resistance. Another obvious route to follow for the person skilled in the art wanting to improve the scratch resistance of a resilient floor panel would be increasing the quantity of applied UV coating, which is typically provided upon the PVC wear layer, to strengthen the coating layer 100 sufficiently to, for example, withstand some deformation. However, the use of a thicker coating layer 100, which can for example be about 1 mm, is undesired for several reasons. Applying higher coating quantities will results in the emission of more volatile organic compound emissions which has a negative effect on the indoor air quality. Further, a thicker coating layer 100 fills any surface texture or embossing, causing the surface of the panel to become substantially flat. Neither would a relatively thick coating layer 100 which still has a rather low Shore D hardness match the scratch resistance of a laminate flooring surface. A panel featuring a soft wear layer and such a thick polyurethane coating was tested and shown to have a scratch resistance of around 3000 g according to ISO 1518, which is classified as relatively low. It was found that the flexible thermoplastic wear layer which is typically provided between the decorative layer 200 and the UV coating, and which generally has a Shore D hardness of only 50 to 55 at 23 degrees Celsius and Vicat softening temperature of less than 80 degrees Celsius, often less than 70 degrees Celsius, is the cause of the lacking scratch resistance of resilient floorings. This causes even bigger issues with scratch resistance and indentation resistance at elevated temperatures. A localized pressure in a sufficiently small surface area on top of the polyurethane/acrylic coating, such as when tested according to ISO 1518 or subjected to the Newton hardness tester pen, will cause localized deformation of the rigid UV layer into the soft wear layer, causing it to crack or break, appearing to the onlooker as a scratch, dent, or a crack.

The achieved synergy of using a coating layer 100 having a Shore D hardness of at least 85 and the substrate having a shore D hardness of at least 80 allows the coating layer 100 to withstand localized pressure, as such it does not deform into a soft substrate, and it will pass scratch resistance testing of 5000 to 6000 g according to ISO 1518, meeting the same scratch resistance as a laminate flooring surface. The person skilled in the art would not consider removing the wear layer as a whole whilst also adapting the substrate specifications as typically the wear layer is considered a key feature of heterogenous flooring. The coating layer 100 according to the present invention is preferably the upper layer or surface layer of the panel.

The Shore D hardness as referred to is in particular the Shore D hardness at a temperature of 23 degrees Celsius.

It is preferred that the coating is directly provided upon the upper surface 500 of the substrate. Typically, the decorative layer 200 is provided upon an upper surface of the core layer 300. Hence, in a preferred embodiment, the coating layer 100 is directly provided upon the decorative layer 200 of the substrate. As indicated above, the use of a wear layer between the decorative layer 200 and a surface coating layer 100 can be omitted for the panel according to the present invention.

In a preferred embodiment, the coating layer 100 covers at least 1%, preferably at least 25%, more preferably at least 50% and even more preferably at least 95% of the upper surface 500 of the substrate and in particular of the decorative layer 200. It is also conceivable that the upper surface 500 of the substrate and in particular of the decorative layer 200 is substantially entirely covered by the coating layer 100.

The coating layer 100, and in particular an upper coating surface of the coating layer 100, has a Shore D hardness of at least 85. However, it is also conceivable that the coating layer 100, and in particular an upper coating surface of the coating layer 100, has a Shore D hardness of at least 90. The Shore D hardness of the upper coating surface of the coating layer 100 can for example be in the range of 90 to 95. Good experimental results were obtain for a coating layer 100 having a hardness in the mentioned range in combination with a substrate according to the present invention. It is conceivable that the panel comprises multiple coating layers 100. Preferably at least one, and possibly each coating layer 100 has a Shore D hardness of at least 85. In particular the coating layer 100 which is applied directly upon the upper surface of the panel has a Shore D hardness of at least 85. It is also conceivable that the upper coating surface of the combination of coating layers 100 has a Shore D hardness of at least 85, possibly at least 90 or in the range of 85 to 95.

The coating layer 100 according to the present invention is preferably at least partially crosslinked. Hence, the coating layer 100 can be a crosslinked coating layer 100. In a preferred embodiment, the coating layer 100 comprises at least one thermosetting resin. It is for example conceivable that the coating layer 100 comprises polyurethane, in particular thermosetting polyurethane and/or that the coating layer 100 comprises an acrylic resin, in particular a thermosetting acrylic resin. The use of a crosslinked coating layer 100 is beneficial as this provides a good rigidity and/or strength to the coating layer 100. Due to the crosslinked character of the coating layer 100 cracking of the coating layer can be at least partially prevented.

In a preferred embodiment, the coating layer 100 comprises at least one crosslinkable prepolymer and at least one photo-initiator and/or at least one additive. The photo-initiator is typically configured to enable UV curing and/or crosslinking. A non-limitative example of a prepolymer which can be used is an acrylic prepolymer or a polyurethane prepolymer. The prepolymer may for example comprise acrylic lacquer and/or polyurethane. Alternatively, at least one prepolymer can be an epoxy polyol coating. In another preferred embodiment, the coating layer 100 comprises at least one crosslinkable oligomer, at least one monomer and/or at least one photo-initiator. The crosslinkable oligomer can for example be an acrylic oligomer or a polyurethane oligomer. Optionally, the coating layer 100 may comprise at least one additive, for example in order to further improve scratch, abrasion, slip resistance, UV resistance and/or other factors.

The coating layer 100 is preferably a polymer-based coating layer. The uncured coating and/or the coating layer 100 comprises typically at least one crosslinkable prepolymer, at least one photo-initiator and/or at least one additive. The coating layer 100 may for example comprise at least one acrylic lacquer and/or polyurethane. The at least one photo-initiator, if applied, is typically configured to enable UV curing, electron beam curing and/or crosslinking. A further additive may be applied in order to improve scratch, abrasion, slip resistance and/or UV resistance. Said photo-initiator can be any chemical compound that decomposes into free radicals when exposed to UV to initiate crosslinking of coatings directly on a surface. Said photo-initiator can be any radical photo-initiator or cationic photo-initiator. It is conceivable that the at least one photo-intiator can be a compound selected from the group comprising of: acrylate- or styrene-based formulations, methyl-2-benzoylbenzoate, 2-hydroxy-2-methyl-1-phenyl-1propanone, benzyl dimethyl ketal, 1-hydroxy-cyclohexylphenyl-ketone, or methyl benzoyl formate, or other photo-initiator, or any combination thereof. It is possible that the photo-initiator can comprise of about 2 wt % to about 10 wt %, preferably 2 wt % to about 5 wt %, more preferably 3 wt % based on total weight of the coating formulation. In case a crosslinkable oligomer is applied, the at least one crosslinkable oligomer is preferably an acrylic oligomer or a polyurethane oligomer. The coating layer 100 can be a polyurethane acrylic coating layer. The coating layer 100 may also comprise a material selected from the group consisting of thermoplastic material, thermosetting material, polyurethane coating, acrylic coating, epoxy polyol coating, polypropylene (PP), polycarbonate (PC), abrasion resistant material, slip resistant material, water resistant material, chemical resistant material, temperature resistant material, or a combination thereof. Preferably, the coating layer 100 is substantially free of polyvinyl chloride (PVC). It is also conceivable that the panel as such is substantially free of PVC. Alternatively, the decorative layer 200 may comprise PVC or the decorative layer 200 can be a PVC layer.

In a possible embodiment, the coating layer 100 comprises a plurality of abrasion resistant particles, in particular chosen from the group of aluminum oxide, corundum, silicon carbide, titanium dioxide, titanium oxide and/or diamond particles or diamond dust. It is conceivable that at least part of the abrasion resistant particles is dispersed in the coating layer 100. In case multiple coating layers 100 are applied, it is conceivable that at least one coating layer comprises a plurality of abrasion resistant particles. For example, only an upper layer of the coating layers could comprise a plurality of abrasion resistant particles or alternatively only a bottom layer of the coating layers could comprise a plurality of abrasion resistant particles. In case at least one coating layers comprises a plurality of abrasion resistant particles, it is beneficial that said coating layer comprises abrasion resistant particles in the range of 0.1 to 5 wt %, preferably 0.5 to 5 wt %, in particular based on total weight of the coating formulation. When applying such amount, the abrasion resistant particles can positively affect the characteristics of the coating layer 100 whilst not changing its primary goal. In a further embodiment, the at least one coating layer 100 may further comprise antimicrobial, antivirus, antibacterial and/or antifungus agents.

The coating layer 100 may further comprise an antimicrobial agent that can be incorporated therein before the curing step. The antimicrobial agent embedded in the coating layer 100, if applied, is conceived to be able to inhibit the emergence and/or growth of microbes such as fungus, bacteria (i.e. gram positive and gram negative bacteria such as *Staphylococcus aureus, Klebsiella pneumoniae* and *Salmonella* and the like), yeast and other pathogens including nonpathogens on the surface of the floor panel. It is conceivable that the antimicrobial agent may be organic or inorganic, preferably non-toxic and without heavy metals. The antimicrobial agent may be selected from the group consisting of quaternary ammonium compounds, sesquiterpene alcohols, halogenated phenyl ethers, halogenated carbanilides, halogenated salicylanilides, bisphenolic compounds, general phenols, formaldehyde, pyridine derivatives and hexachlorophene. The aforementioned antimicrobial agents are preferred over disinfectants such as iodine and complexes thereof as these are highly pigmented and may cause detrimental effects to the chemical, mechanical and physical properties of the coating layer 100, specially to the transparency/clarity of the coating layer 100 which is desired in order to conserve the aesthetics of the panel. The antimicrobial agent, if applied, is preferably present in the coating layer from about 0.05% to about 5% by weight, preferably from about 0.070% to about 3.5%, more preferably from about 0.080% to about 3%. It is experimentally found that said amount of antimicrobial agent in the coating layer 100 is able to survive crosslinking/polymerization during the curing process, or in other words is not destroyed during curing, without causing undesirable effects to the chemical, mechanical and physical properties of the coating layer 100. Said amount of antimicrobial agent in the coating layer 100 is also experimentally found to last the lifetime of the coating layer 100 while also being sufficient to inhibit the formation and/or growth of microbes.

In a preferred embodiment, the coating layer 100 is substantially transparent and/or translucent. In this way, the use of the coating layer 100 will not negatively affect the appearance of the decorative layer 200. The aesthetic appearance of the panel could for example also be enhanced by the coating layer 100 comprises at least one matting agent, such as a matting powder. It is also conceivable that the coating layer 100 is subjected to an excimer finishing step for obtaining higher density at the top surface of the coating layer 100, for example within 1 to 5 µm from the top surface. It is for example conceivable that an upper part of coating layer 100 has a higher density than the rest of the coating layer. For example, a layer of about 2 µm to 5 µm of the upper part of coating layer may have a higher density than the rest of the coating layer. Hence, it is conceivable that the coating layer 100 comprises a (high density) crust layer which is integrally formed at the upper part of the coating layer.

At least one coating layer is preferably substantially equal in thickness over its volume. The coating layer 100 preferably has a thickness in the range of 0.01 mm to 0.30 mm, preferably in the range of 10 to 50 urn. Such relatively thin coating layer 100 can still provide sufficient rigidity and scratch resistance for the panel due to the relatively high Shore D hardness.

It is conceivable that the core layer 300 of the substrate comprises at least one Vicat modifier in particular in order to further improve the material properties of the core layer 300. The core layer 300 may for example comprise at least one additive configured to increase the Vicat softening temperature. The Vicat softening temperature of the core layer 300 is preferably at least 80 degrees Celsius, more preferably at least 85 degrees Celsius. It is also conceivable that the Vicat softening temperature of the core layer 300 is in the range of 80 to 95 degrees Celsius or 85 to 95 degrees Celsius. The Vicat softening temperature of the core layer 300 could for example also be substantially 90 degrees Celsius. Optionally, the Vicat softening temperature of the core layer 300 can be higher than 95 degrees Celsius or higher than 100 degrees Celsius. At least one additive could for example comprise acrylonitrile styrene acrylate (ASA), acrylonitrile butadiene styrene ABS, a thermoset system and/or an epoxy system. The additive can also be referred to as Vicat modifier. The use of at least one Vicat modifier may in particular be of interest when the core layer 300 of the substrate comprises a thermoplastic mineral composite, having a mineral to thermoplastic ratio of at least 3:1. This is to ensure the Shore D hardness is maintained and/or controlled at elevated temperatures.

The surface roughness of at least part of the coating layer 100, in particular the upper coating surface, is preferably at least 1 µm Ra, preferably at least 2 µm Ra, more preferably at least 3 µm Ra. At least part of the coating layer 100 may comprise a plurality of micro-undulations while maintaining a surface roughness Ra of at least 3 µm, wherein at least a part of the micro-undulations has a peak to valley height Rz of 15 µm or less and/or wherein at least a part of the micro-undulations has a peak to valley height Rz of at least 15 pin. Such embodiment would enable sufficient slip resistance for the surface of the coating layer 100, and thus for the panel as such. The obtain roughness and/or peak to valley high can for example be achieved by having multiple coating layers each with micro-undulations and/or micro creases with a compounding effect.

An adequate surface roughness of the upper surface 500 of the substrate can positively contribute to the bonding between the coating layer 100 and the substrate. It is in particular preferred that the substrate has a (surface) roughness (Ra) of at least 0.5 urn. More preferably, the roughness of the substrate is at least 1 µm. Hence, the upper surface 500 of the substrate may have a roughness of at least 0.5 µm, preferably at least 1 µm. These characteristic enables proper bonding between the upper core layer and the coating layer 100. The upper surface 500 of the substrate of the panel according to the present invention preferably comprises a macrotexture with depths and/or heights imitating a real stone or wood surface, preferably applied by mechanical or chemical means. It is preferred that the maximum texture depth is at most 0.6 mm, preferably around 0.3 mm, with a variance of maximum 0.1 mm.

The upper surface 500 of the substrate of the panel according to the present invention typically has a Shore D hardness of at least 80. However, in a preferred embodiment, the upper surface 500 of the substrate of the panel has a Shore D hardness of at least 85, and possibly at least 90. It is preferred that the Shore D hardness of the upper coating surface of the coating layer 100 is higher than the Shore D hardness of upper surface 500 of the substrate. It is preferred that the Shore D hardness of the coating layer 100 and the substrate is within a difference of 5.

The panel preferably comprises at least one décor layer. It is conceivable that at least one décor layer is attached to said the core layer 300, if applied. It is also conceivable that the décor layer is a print layer. It is also conceivable that at least one decorative layer 200 is a print layer, in particular a digital print layer. The décor layer may also form integral part of the core layer 300. In a beneficial embodiment of the panel, at least part of the upper surface of the core layer 300 is provided with at least one decorative pattern or decorative image. It is for example possible that such decorative image or pattern is provided via printing, for example via digital and/or inkjet printing. It is also possible that at least one decorative pattern is formed by relief provided in the upper surface of the core layer 300 or panel. It is also conceivable that the décor layer or decorative layer 200 is a separate layer, for example a comprises a high-pressure laminate (HPL), a veneer layer and/or a ceramic tile. In a preferred embodiment, at least one decorative layer 200 comprises a thermoplastic film or a ply of cellulose. It is for example possible that the décor layer comprises a plurality of impregnated layers containing lignocellulose but also a wood veneer, a thermoplastic layer, a stone veneer, a veneer layer or the like and/or a combination of said materials. The veneer layer is preferably selected from the group comprising of wood veneer, cork veneer, bamboo veneer, and the like. Other materials such as ceramic tiles or porcelain, a real stone veneer, a rubber veneer, a decorative plastic or vinyl, linoleum, and laminated decorative thermoplastic material in the form of foil or film. The thermoplastic material can be PP, PET, PVC and the like. The design of the decorative layer 200 can be chosen from a design database which includes digitally processed designs, traditional patterns, pictures or image files, customized digital artworks, randomized image pattern, abstract art, wood-patterned images, ceramic or concrete style images, or user-defined patterns. The designs can be printed or reproduced using laser printers, inkjet printers, or any other digital printing means including the conventional printing methods. Various types of inks can also be used to suit the design needs of the décor layer. Preferably, the ink used during the printing method comprises properties such as but is not limited to waterproofness, lightfastness, acid-free, metallic, glossy, sheen, shimmering, or deep black, among others. It is desirable that the decorative layer 200 is visually exposed by the coating layer 100 being a substantially transparent coating layer. The décor layer may comprise a pattern, wherein the pattern is printed via digital printing, inkjet printing, rotogravure printing machine, electronic line shaft (ELS) rotogravure printing machine, automatic plastic printing machine, offset printing, flexography, or rotary printing press. The thickness of the decorative layer 200 is preferably in the range of 0.05 mm and 0.10 mm, for example substantially 0.07 mm.

The core layer 300 can also be called the carrier layer, carrier plate, carrier core and/or panel core. The core layer 300 is in particular configured to provide rigidity and strength to allow a floating installation, and also provides a substantially flat surface on which to provide the decorative layer 200.

The substrate and in particular the core layer 300 may comprise a composite material. The core layer 300 may for example comprise a filler and at least one binder. The binder can be selected from, but is not limited to, thermoplastic or thermoset resins including but not limited to vinyl, polyvinyl chloride (PVC), polyethylene (PE), polyurethane (PLU), acrylonitrile butadiene styrene (ABS), melamine, and/or polypropylene (PP). Preferably, the ratio of weight percentages of filler relative to binder is at least 1:1, more preferably at least 2:1, most preferably at least 3:1. The filler material used in the core layer 300 can comprise organic or inorganic materials which includes but is not limited to cellulose materials, fibrous materials, kraft paper, saw dusts, wood dusts, wood fibers, long wood fibers, short wood fibers, sand, lime, volcanic ash, plants-based fibers such as mushroom fibers, cotton fibers, bamboo fibers, abaca fibers, pineapple fibers, magnesium compounds, magnesium oxide, magnesium carbonate, limestone, polymeric fibers, glass fibers, carbon-based fibers, polymeric pellets, or hollow microspheres or particles having size ranging from 1 to 1000 micrometers made of but is not limited to ceramics, glass, polymers, composites, or metals. Preferably, the core layer 300 includes at least one filler selected from the group consisting of: minerals, preferably calcium carbonate; and pigments, modifiers, fibers, such as: glass fiber, wood, straw and/or hemp. The fibers can be loose fibers and/or interconnected fibers to form a woven or nonwoven layer. Preferably the core layer 300 further includes at least one additional filler selected from the group consisting of steel, glass, polypropylene, wood, acrylic, alumina, curaua, carbon, cellulose, coconut, kevlar, Nylon, perlon, polyethylene, PVA, rock wool, viburnum and fique. This can further increase the strength of the panel itself and/or the water resistance and/or fire resistance of the panel.

It is conceivable that at least one core layer 300 comprises a composite material, in particular a mineral composite material, more in particular a mineral thermoplastic composite. The core layer 300 may for example comprise a magnesium oxide or MgO-based composite. The core layer 300 may for example comprise $MgCl_2$ and/or $MgSO_4$. The composite core layer may for example comprise at least 20% by weight of magnesium oxide. A non-limiting example of a possible composite core layer, is a core layer comprising 30 to 40% by weight magnesium oxide, 10 to 20% by weight magnesium chloride or magnesium sulfate, 10 to 15% by weight water, 5 to 10% by weight magnesium hydroxide, 5 to 10% by weight calcium carbonate, 5 to 50% by weight lignocellulose (e.g. wood fibers or cork) and/or 10-15% by weight additives. It is found that a composite core layer, in particular a mineral composite core layer, has a good stability to heat which is also beneficial for the panel as such. The density of at least one core layer is preferably between 1200 and 2000 kg/m3, more preferably between 1400 and 1600 kg/m3. However, it is also conceivable that the density of at least one core layer is about 2000 kg/m3. The latter is for example possible when the core layer 300 comprises an thermoplastic mineral composite. The mineral material can be selected from the group of magnesium oxide, magnesium carbonate, magnesium oxysulfate, magnesium oxychloride cement (MOC), magnesium chloride ($MgCl_2$), magnesium sulfate ($MgSO_4$), Sorel cement, fiber cement, MOS cement, limestone, calcium carbonate, calcite mineral, stone, chalk, clay, calcium silicate and/or talc. In some embodiments, the mineral material is preferably present as particulate mineral filler of at least 200 mesh, preferably more than 300 mesh. The thermoplastic mineral composite core layer may for example comprise 60 to 70% by weight of calcium carbonate, 20 to 25% by weight of polyvinyl chloride and possibly 5 to 10% by weight of additives. At least one core layer may comprise a density gradient, for example wherein the density near the upper surface is higher than the density near the bottom surface, or wherein the density near the upper surface and the bottom surface is higher than the density of a central region situated between said upper surface and bottom surface. A further non-limiting example of a possible core layer 300 is an HDF based core layer comprising cellulose and a thermosetting resin. It is also conceivable that the core layer 300 is a wood-based core comprising cellulose and/or a geopolymer based on magnesium oxide. The panel and/or the core layer is preferably waterproof.

In a preferred embodiment the core layer 300 may comprise at least one additive material, advantageously including surface active substances (surface active substances, SAS), such as methyl cellulose, "Badimol" plasticizing materials and other cationic active SAS, in particular configured to improve the rheology of the mixture. The core may also include bentonite. Bentonite is a finely ground natural product suitable for increasing the rheological and waterproof properties of the panel itself. The core layer 300 may also comprise a combination or composite of any of the materials previously mentioned. It is conceivable that the composite material comprises at least 20% by weight of filler and/or 15% to 50% by weight of a binder. This range is found to secure sufficient stability and strength of the core layer 300 while also allowing for necessary flexibility thereof and improving temperature resistance as well. It is beneficial to apply a substrate or core layer 300 having a rigidity of at least 3500 MPa, in particular when measured according to EN310 or ASTM D790.

The substrate and/or core layer 300 may for example have a thickness of at least 4 mm. It is for example possible that the thickness of the core layer 300 is between 3 and 9 mm, preferably between 4 mm and 5.5 mm or between 5.5 mm and 7 mm. It is conceivable that at least one core layer comprises at least one reinforcing layer. The reinforcing layer can for example be a reinforcing mesh. Possibly, the core comprises at least two reinforcing layers, wherein a first reinforcing layer is located near the upper surface and wherein a further reinforcing layer is located near the bottom surface. Preferably, at least one reinforcing layer comprises a mesh or web, preferably comprising fiberglass, jute and/or cotton.

The substrate, and in particular the core layer 300, may optionally comprise complementary coupling parts. The core could for example comprise at least one pair of opposite side edges which are provided with complementary coupling parts. The complementary coupling parts, if applied, are typically configured for interconnecting adjacent panels. Typically, at least one pair of opposite side edges of the core layer 300 is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as know % n in the art could be applied. For example, said interlocking coupling parts may be in the form of complementary tongue and groove, male and female receiving parts, a projecting strip and a recess configured to receive said strip or any other suitable form. It is conceivable the complementary coupling parts require a downward scissoring motion when engaging, or are locked together by means of a horizontal movement. It is further conceivable that the interconnecting coupling mechanism comprise a tongue and a groove wherein the tongue is provided on one side edge of one pair of opposite side edges, and the groove is provided on the other side edge, or an adjacent side edge relative to that of the tongue, of the same pair of opposite side edges. Such a design of coupling mechanism is well-known in the art and has proven highly suitable for panels for floor coverings such as a floating floor. In a further embodiment it is possible that the interconnecting coupling mechanism have an interlocking feature which prevents interconnected panels from any free movement (play). Such an interlocking feature may be a projection and a respective recess provided on the respective opposite side edges by which neighboring panels interlock with each other. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer 300. It is also conceivable that a strengthening coat layer of micro or nanotechnology is added on the surface of the interlocking coupling parts. The panel according to the present invention and/or the panel obtained via the method according to the present invention is suitable for use in flooring, wall or ceiling coverings preferably featuring a locking mechanism. As such a 'floating' covering can be assembled by interconnecting the individual panels with each other at all four sides, without the need for adhesives.

The panel may comprise at least one further layer, such as but not limited to a backing layer. The method according to the present invention may also include the step of providing and/or attaching at least one backing layer to the bottom surface of the core layer 300. In case a backing layer is applied, the backing layer can be adhered on the bottom surface 400 of the substrate, and in particular of the core layer 300 via an adhesive. The backing layer is preferably made of a polymer material, for example but not limited to polyurethane. The backing layer nay also be a sound absorbing layer. Such sound absorbing backing layer may further contribute to the good acoustic properties of the panel. Such backing layer may also be referred to as an acoustic layer. The backing layer may be composed of a foamed layer, preferably a low-density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp or cork, and/or recycled/recyclable material such as PET. The backing layer, if applied, preferably has a density between 65 kg/m3 and 300 kg/m3, most preferably between 80 kg/m3 and 150 kg/m3.

The invention also relates to a method for producing a decorative panel, in particular a floor panel, wall panel or ceiling panel, comprising the steps of:
  a) providing at least one substrate comprising an upper surface and a bottom surface and preferably two pairs of opposing side edges, wherein the substrate comprises:
    at least one core layer; and
    at least one decorative layer; and
    wherein the upper surface of the substrate has a Shore D hardness of at least 80;
  b) applying at least one coating layer upon the upper surface of the substrate, wherein the coating layer is a crosslinkable coating layer; and
  c) curing said coating layer such that a crosslinked coating layer having a Shore D hardness of at least 85 is obtained.

The method results in the provision of a panel according to the present invention. The substrate applied at step a) can be any of the substrates described for the panel according to the present invention. The upper surface 500 of the substrate of the panel may for example have a Shore D hardness of at least 85, and possibly at least 90 in particular at 23 degrees Celsius. It is conceivable that the coating layer 100, and in particular an upper coating surface of the coating layer 100, has a Shore D hardness of at least 90. The Shore D hardness of the upper coating surface of the coating layer can for example be in the range of 90 to 95. It is preferred that the Shore D hardness of the upper coating surface of the coating layer 100 is higher than the Shore D hardness of upper surface 500 of the substrate. The curing step can also be referred to as a drying step. However, it is also conceivable that the curing step is an UV curing step.

The coating layer 100 (applied at step b)) comprises preferably at least one crosslinkable prepolymer and at least one photo-initiator. It is also conceivable that the coating layer 100 comprises at least one thermosetting resin. The method according to the present invention enables that relatively thin coating layers can be applied. This is beneficial for economic reasons, but also for environmental reasons as it may reduce the amount of emitted volatile organic compounds in particular during the manufacturing process. At least one coating layer can for example be applied with a weight of 5 to 15 g/m2 per layer, preferably at average thickness of 5 to 15 Ra. Preferably, at least one coating layer is applied with a quantity of less than 100 g/m2, more preferably lower than 75 g/m2. It is for example also conceivable that at least one coating layer 100 is applied with a weight in a range 40 to 60 g/m2. The coating layer 100 is preferably applied in a quantity of at least 40 g/m2 and optionally at most 100 g/m2. This positively contributes to the coating layer 100 being able to reach certain abrasion resistance requirements. The coating layer 100 may consist of multiple lay ers. Each layer may be dried or pre-cured at different energy levels, ranging from 100-200 mJ/cm$^2$ and a wavelength of 150-400 nm, such would activate the photo-initiator and cause a chain reaction. At least one layer can be subjected to relatively high energy levels of up to 700-900 mJ/cm$^2$, thereby allowing a relatively low porosity of the resulting cured coating composition. The curing of the top layer of the coating layer 100 can be accompanied or preceded by a very low wavelength of below 220 nm and high energy level curing step. In this case, it is possible and even desirable to reduce the amount of photo-initiator as the acrylic compound will be activated even without it, allowing a very high-density top, or (integral) crust layer, to form at the top of the coating. The viscosity of the (uncured) coating layer 100 is preferably smaller than 5000 Pa·s at 25 degrees Celsius, preferably between 500 and 3000 Pa·s at 25 degrees Celsius and more preferably between 800 and 1500 Pa·s at 25 degrees Celsius, in an uncured condition. Hence, said viscosity values apply to the material of the coating layer prior to and/or during applying of the coating layer upon the panel. The surface tension of the applied uncured coating is preferably below 38 dynes per centimeter. In a preferred embodiment, the ratio of the surface energy of the substrate layer to the surface tension of the coating layer 100 is at least 1:1 and more preferably at least 1.5:1. The coating layer 100 preferably has a thickness of 0.01 mm to 0.30 mm.

The method may further comprise the step of applying a texture onto the (upper surface 500 of the) substrate and in particular the core layer 300. In case of a panel featuring mechanically applied texture, such as with an embossing or texturing roller or press plate, the texture can be applied directly onto the core featuring the visual. The texture can be for example a stone, tile or wood texture. The texture preferably has a maximum depth of 0.6 mm. The texture, if applied, is preferably applied mechanically before the coating step, and most preferably during an extrusion or thermal lamination step. More specifically, it is preferred that it is a texture of 0.3-0.6 mm deep in particular applied by means of a texture roller or texture plate under high temperature and/or pressure on the upper surface 500 of the substrate. This substrate generally comprises a core and at least one design element, preferably a printed film and/or a digitally printed visual. The variation between depth of the texture across the design is preferably within 0.1 mm to avoid uneven filling of the texture by the coating. The coating or UV-cured finish is then preferably applied in a weight or quantity of less than 100 g/m2 to allow deep surface textures.

The coating layer 100 can for example be applied via roller coating. It is for example conceivable that an EPDM roller is applied. More in particular, an ethylene propylene rubber (EPDM) roller with a Shore D hardness of about 35 and/or a surface energy of 25 mN/m or 25 dyn/cm can be applied. However, it is also conceivable that at least one coating layer 100 is applied via spray coating. The coating layer 100 may comprise a plurality of abrasion resistant particles, in particular chosen from the group of aluminum oxide, corundum, silicon carbide, titanium dioxide, titanium oxide and/or diamond particles or diamond dust. It is conceivable that at least part of the abrasion resistant particles is dispersed in the coating layer 100. The method according to the present invention may further include the step of applying at least one decorative image onto the core layer 300. It is also possible that the method includes the step of providing at least one decorative layer 200 onto the core layer 300, Said step is preferably provided prior to the coating layer 100 is applied. The coating layer 100 can be directly applied upon the décor layer and/or decorative layer 200.

The invention will now be elucidated into more detail with reference to the following non-limitative clauses.
  1. Decorative panel, in particular a floor panel, wall panel or ceiling panel, the panel comprising:
    at least one substrate comprising an upper surface and a bottom surface and preferably two pairs of opposing side edges, wherein the substrate comprises:
      at least one core layer; and
      at least one decorative layer; and
    at least one coating layer, wherein the coating layer is provided upon the upper surface of the substrate;

wherein the upper surface of the substrate has a Shore D hardness of at least 80 and/or wherein the coating layer has a Shore D hardness of at least 85.

2. Panel according to clause 1, wherein the coating layer is directly provided upon the decorative layer of the substrate.

3. Panel according to clause 1 or clause 2, wherein the coating layer has a Shore D hardness of at least 90.

4. Panel according to any of the previous clauses, wherein the coating layer has a Shore D hardness in the range of 90 to 95.

5. Panel according to any of the previous clauses, wherein the coating layer comprises at least one thermosetting resin.

6. Panel according to any of the previous clauses, wherein the coating layer comprises at least one crosslinkable prepolymer and at least one photo-initiator.

7. Panel according to clause 6, wherein the prepolymer is an acrylic prepolymer or a polyurethane prepolymer.

8. Panel according to any of the previous clauses, wherein the coating layer comprises a plurality of abrasion resistant particles, in particular chosen from the group comprising of aluminum oxide, corundum, silicon carbide, titanium dioxide, titanium oxide, diamond particles, or combinations thereof.

9. Panel according to clause 8, wherein the coating layer comprises abrasion resistant particles in the range of 0.5 to 5 wt %.

10. Panel according to any of the previous clauses, wherein the coating layer is substantially transparent.

11. Panel according to any of the previous clauses, wherein the coating layer comprises at least one matting agent.

12. Panel according to any of the previous clauses, wherein the coating layer is substantially free of polyvinyl chloride.

13. Panel according to any of the previous clauses, wherein the coating layer has a thickness in the range of 0.01 mm to 0.30 mm.

14. Panel according to any of the previous clauses, wherein the core layer has a Vicat softening temperature of at least 80 degrees Celsius, preferably at least 85 degrees Celsius, preferably at least 90 degrees Celsius.

15. Panel according to any of the previous clauses, wherein the surface roughness of the coating layer is at least 3 μm Ra.

16. Panel according to any of the previous clauses, wherein the panel or the coating layer comprises multiple coating layers.

17. Panel according to any of the previous clauses, wherein the upper surface of the substrate has a Shore D hardness of at least 85.

18. Panel according to any of the previous clauses, wherein at least one decorative layer is a print layer.

19. Panel according to any of the previous clauses, wherein at least one decorative layer comprises a thermoplastic film or a ply of cellulose.

20. Panel according to any of the previous clauses, wherein the core layer of the substrate comprises a mineral thermoplastic composite.

21. Panel according to any of the previous clauses, wherein the substrate, and in particular the core layer, comprises at least one pair of opposite side edges, and preferably each pair of opposite side edges, is provided with complementary coupling parts.

22. Method for producing a decorative panel, in particular a floor panel, wall panel or ceiling panel, in particular according to any of the previous clauses comprising the steps of:
   a) providing at least one substrate comprising an upper surface and a bottom surface and preferably two pairs of opposing side edges, wherein the substrate comprises:
      at least one core layer; and
      at least one decorative layer, and
      wherein the upper surface of the substrate preferably has a Shore D hardness of at least 80; and
   b) applying at least one coating layer upon the upper surface of the substrate, wherein the coating layer is a crosslinkable coating layer;
   c) curing said coating layer in particular such that a crosslinked coating layer having a Shore D hardness of at least 85 is obtained.

23. Method according to clause 22, wherein the coating layer (applied at step b)) comprises at least one crosslinkable prepolymer and at least one photo-initiator and/or wherein the coating layer comprises at least one thermosetting resin.

24. Method according to clause 22 or 23, wherein the curing step is an UV curing step.

25. Method according to any of clauses 22-24, wherein the coating layer is applied in a quantity of at least 40 g/m2.

26. Method according to any of clauses 22-25, wherein the coating layer comprises a plurality of abrasion resistant particles, preferably chosen from the group comprising of aluminum oxide, silicon carbide, titanium dioxide, titanium oxide and/or diamond particles, or combinations thereof.

27. Method according to any of clauses 22-26, comprising the step of applying a texture to the upper surface of the substrate, the texture preferably comprising a maximum depth of 0.6 mm.

28. Method according to clauses 27, wherein the texture is applied synchronously to the design of the decorative layer.

29. Method according to any of clauses 22-28, wherein the core layer has a Vicat softening temperature of at least 80 degrees Celsius, preferably at least 85 degrees Celsius, preferably at least 90 degrees Celsius.

It will be apparent that the invention is not limited to the examples described, but that numerous variants are possible within the scope of the attached claims that will be obvious to a person skilled in the art. It is not necessary to elaborate on examples of all conceivable combinations of the above-described inventive concepts, as a person skilled in the art will understand numerous inventive concepts can be (re) combined in order to arrive at a specific application.

The verb "comprise" and conjugations thereof used in this patent publication are understood to mean not only "comprise", but are also understood to mean the phrases "contain", "substantially consist of" "formed by" and conjugations thereof.

The invention claimed is:

1. A decorative panel, the panel comprising:
   at least one substrate comprising an upper surface and a bottom surface, wherein the substrate comprises:
      at least one core layer; and
      at least one decorative layer, wherein the at least one decorative layer comprises at least one printed pattern; and
   at least one coating layer, wherein the coating layer is provided upon the upper surface of the substrate;

wherein the upper surface of the substrate has a Shore D hardness of at least 80 and wherein the coating layer has a Shore D hardness of at least 85, wherein the core layer has a Vicat softening temperature of at least 80 degrees Celsius.

2. The panel according to claim 1, wherein the printed pattern is at least partially digitally printed.

3. The panel according to claim 1, wherein the printed pattern is at least partially printed via laser printing, digital printing, inkjet printing, rotogravure printing, electronic line shaft rotogravure printing, automatic plastic printing, offset printing, flexography, and/or rotary printing.

4. The panel according to claim 1, wherein the decorative layer comprises a decorative thermoplastic foil or film comprising PP, PET, and/or PVC or a ply of cellulose.

5. The panel according to claim 1, wherein the decorative layer forms an integral part of the core layer and/or wherein the upper surface of the core layer is provided with the at least one printed pattern.

6. The panel according to claim 1, wherein the at least one coating layer is directly provided upon the decorative layer of the substrate.

7. The panel according to claim 1, wherein the at least one coating layer is applied with a weight of 5-100 g/m2.

8. The panel according to claim 1, comprising a plurality of coating layers.

9. The panel according to claim 1, wherein the at least one coating layer has a Shore D hardness of at least 90 and/or wherein the upper surface of the substrate has a Shore D hardness of at least 85.

10. The panel according to claim 1, wherein the at least one coating layer comprises at least one thermosetting resin and/or wherein the coating layer comprises at least one crosslinkable prepolymer and at least one photo-initiator.

11. The panel according to claim 1, wherein the at least one coating layer comprises a plurality of abrasion resistant particles selected, from aluminum oxide, corundum, silicon carbide, titanium dioxide, titanium oxide, diamond particles, or combinations thereof.

12. The panel according to claim 11, wherein the at least one coating layer comprises abrasion resistant particles in the range of 0.5 to 5 wt %.

13. The panel according to claim 1, wherein the at least one coating layer is substantially transparent.

14. The panel according to claim 1, wherein the at least one coating layer comprises at least one polyurethane resin, and/or at least one acrylic resin.

15. The panel according to claim 1, wherein the at least one coating layer has a thickness in the range of 0.01 mm to 0.30 mm.

16. The panel according to claim 1, wherein a surface roughness of the at least one coating layer is at least 3 um Ra.

17. The panel according to claim 1, wherein the at least one core layer comprises at least one pair of opposite side edges, and wherein each pair of opposite side edges is provided with one or more complementary coupling parts.

18. A method for producing a decorative panel, comprising the steps of:
a) providing at least one substrate comprising an upper surface and a bottom surface and two pairs of opposing side edges, wherein the substrate comprises at least one core layer, wherein the upper surface of the substrate has a Shore D hardness of at least 80, and wherein the core layer has a Vicat softening temperature of at least 80 degrees Celsius,
b) printing at least one decorative pattern upon the core layer such that at least one decorative layer is formed,
c) applying at least one coating layer upon the upper surface of the substrate, wherein the coating layer is a crosslinkable coating layer; and
d) curing said coating layer such that a crosslinked coating layer having a Shore D hardness of at least 85 is obtained.

19. The method according to claim 18, wherein the decorative pattern is at least partially digitally printed.

20. The method according to claim 18, wherein the at least one coating layer comprises at least one crosslinkable prepolymer and at least one photo-initiator and/or wherein the coating layer comprises at least one thermosetting resin.

21. The method according to claim 18, comprising the step of applying a texture to the upper surface of the substrate.

22. The method according to claim 18, wherein the curing step is an UV curing step and/or excimer curing step.

23. The method according to claim 18, wherein the at least one coating layer comprises a plurality of abrasion resistant particles selected from aluminum oxide, silicon carbide, titanium dioxide, titanium oxide, and/or diamond particles, or combinations thereof.

* * * * *